United States Patent
Laycock et al.

(10) Patent No.: US 9,987,776 B2
(45) Date of Patent: Jun. 5, 2018

(54) COMPOSITE PANEL

(75) Inventors: Mervyn Laycock, Vossem (BE); Jan Christiaan Stevens, Mol (BE); Luc Van Essche, Kortenberg (BE); Robert Weggelaar, Overijse (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 1371 days.

(21) Appl. No.: 12/304,347

(22) PCT Filed: Jun. 5, 2007

(86) PCT No.: PCT/EP2007/055490
§ 371 (c)(1),
(2), (4) Date: Dec. 11, 2008

(87) PCT Pub. No.: WO2007/144291
PCT Pub. Date: Dec. 21, 2007

(65) Prior Publication Data
US 2009/0324932 A1 Dec. 31, 2009

(30) Foreign Application Priority Data
Jun. 14, 2006 (EP) .................................. 06115470

(51) Int. Cl.
B32B 3/26 (2006.01)
B29C 44/56 (2006.01)
B29C 44/12 (2006.01)
B32B 5/28 (2006.01)

(52) U.S. Cl.
CPC ........ B29C 44/569 (2013.01); B29C 44/1285 (2013.01); B32B 5/28 (2013.01); Y10T 428/249991 (2015.04)

(58) Field of Classification Search
CPC ........ C08G 2105/02; C08G 2101/0041; C08G 2125/00; C08G 2170/60; C08J 2375/00; B32B 15/046; B32B 15/08; B32B 27/065; B32B 27/40; B32B 5/18; B32B 5/20; B32B 5/28; B32B 2250/40; B29C 44/1285; B29C 44/569; Y10T 428/249991
USPC ............................................. 428/317.9, 319.9
See application file for complete search history.

(56) References Cited

U.S. PATENT DOCUMENTS

| | | | |
|---|---|---|---|
| 3,635,848 A * | 1/1972 | Rambosek | ..................... 521/105 |
| 3,940,517 A | 2/1976 | DeLeon | |
| 3,989,781 A * | 11/1976 | Chant | ................ B29C 44/5618 264/257 |
| 4,066,580 A | 1/1978 | Falkenstein et al. | |
| 4,073,997 A * | 2/1978 | Richards et al. | ............. 442/374 |
| 4,126,741 A | 11/1978 | Carleton et al. | |
| 4,126,742 A | 11/1978 | Carleton et al. | |
| 4,129,697 A | 12/1978 | Schapel et al. | |
| 4,247,656 A | 1/1981 | Janssen et al. | |
| 4,424,288 A | 1/1984 | Patton et al. | |
| 4,661,533 A | 4/1987 | Stobby et al. | |
| 4,871,612 A | 10/1989 | Okina et al. | |
| 4,900,776 A | 2/1990 | Bock et al. | |
| 4,952,358 A * | 8/1990 | Okina et al. | ................... 264/134 |
| 5,049,439 A * | 9/1991 | Robinson | ...................... 442/225 |
| 5,137,929 A | 8/1992 | Demmin et al. | |
| 5,232,957 A | 8/1993 | Pritchard et al. | |
| 5,260,344 A | 11/1993 | Ashida et al. | |
| 5,286,759 A | 2/1994 | Smits et al. | |
| 5,418,261 A | 5/1995 | Helsemans et al. | |
| 5,556,934 A | 9/1996 | Hagquist et al. | |
| 5,662,996 A | 9/1997 | Jourquin et al. | |
| 5,900,442 A | 5/1999 | Leenslag et al. | |
| 5,928,772 A | 7/1999 | Shiraishi et al. | |
| 5,968,993 A | 10/1999 | Bleys | |
| 6,444,720 B1 | 9/2002 | Klesczewski et al. | |
| 6,509,392 B1 | 1/2003 | Jhaveri et al. | |
| 6,624,283 B2 | 9/2003 | Viegas et al. | |
| 6,713,167 B2 | 3/2004 | Di Sante et al. | |
| 6,773,756 B2 | 8/2004 | Meyer-Ahrens et al. | |
| 6,793,855 B2 | 9/2004 | Cheolas et al. | |
| 6,800,667 B1 | 10/2004 | Kreyenschmidt et al. | |
| 6,806,342 B2 | 10/2004 | Bleys et al. | |
| 6,884,824 B2 | 4/2005 | Bleys et al. | |
| 2002/0019452 A1 | 2/2002 | Koels et al. | |
| 2002/0045690 A1 | 4/2002 | Cheolas et al. | |
| 2004/0003563 A1 * | 1/2004 | Burdic | ........................... 52/408 |
| 2004/0069971 A1 | 4/2004 | Witteveen et al. | |
| 2004/0249078 A1 | 12/2004 | Bogdan et al. | |
| 2005/0163969 A1 | 7/2005 | Brown | |
| 2006/0084777 A1 | 4/2006 | Bleys et al. | |
| 2008/0004361 A1 | 1/2008 | Palermo | |
| 2008/0227929 A1 | 9/2008 | Jozef et al. | |
| 2008/0262168 A1 | 10/2008 | Bleys et al. | |
| 2009/0005517 A1 | 1/2009 | Bleys et al. | |

FOREIGN PATENT DOCUMENTS

| | | |
|---|---|---|
| DE | 10145458 | 4/2003 |
| DE | 10359024 | 7/2005 |
| EP | 226176 | 6/1987 |
| EP | 304005 | 2/1989 |
| EP | 587317 | 3/1994 |
| EP | 608626 | 8/1994 |
| EP | 745627 | 12/1996 |
| EP | 830419 | 3/1998 |
| EP | 922063 | 6/1999 |

(Continued)

OTHER PUBLICATIONS

G. Woods, The ICI Polyurethanes Book, 1990, $2^{nd}$ edition, p. 32-35.

*Primary Examiner* — Elizabeth M Cole

(74) *Attorney, Agent, or Firm* — Huntsman International LLC; Robert Diaz

(57) ABSTRACT

Composite panel which comprises a layer of foamed material having a density of less than 100 kg/m$^3$ which layer is sandwiched between 2 layers of fiber reinforced polyisocyanurate material.

10 Claims, No Drawings

(56) References Cited

FOREIGN PATENT DOCUMENTS

| | | |
|---|---:|---:|
| EP | 1173495 A | 1/2002 |
| EP | 1178097 | 2/2002 |
| EP | 1199154 | 4/2002 |
| EP | 1346819 | 9/2003 |
| EP | 1428848 A | 6/2004 |
| GB | 1433642 | 4/1976 |
| GB | 1491620 | 11/1977 |
| JP | 57131276 | 8/1982 |
| JP | 58011529 | 1/1983 |
| JP | 58034832 | 3/1983 |
| JP | 58145431 | 8/1983 |
| JP | 62101622 | 5/1987 |
| JP | 05140257 | 6/1993 |
| JP | 06199977 | 7/1994 |
| WO | WO 98/00450 A | 7/1994 |
| WO | WO 00/29459 A | 5/2000 |
| WO | WO 02/00752 A | 1/2002 |
| WO | WO 02/06370 A | 1/2002 |
| WO | WO 02/10249 A | 2/2002 |
| WO | WO-2004/111101 | 12/2004 |
| WO | WO 05/072188 A | 8/2005 |
| WO | WO-2006/008780 | 1/2006 |
| WO | WO-2007/042407 | 4/2007 |
| WO | WO-2007/042411 | 4/2007 |
| WO | WO-2007/096216 | 8/2007 |

\* cited by examiner

COMPOSITE PANEL

CROSS REFERENCE TO RELATED APPLICATIONS

This application is the National Phase of International Application PCT/EP2007/055490 filed Jun. 5, 2007 which designated the U.S. and which claims priority to European (EP) Pat. App. No. 06115470.4 filed Jun. 14, 2006. The noted applications are incorporated herein by reference.

The present invention relates to a composite panel which comprises a layer of foamed material having a density of less than 100 kg/m$^3$ which layer is sandwiched between 2 layers of fiber reinforced material.

The use of polyisocyanurate in binding several materials is known and widely described; amongst other materials glass fibers have been mentioned. Citations worthwhile mentioning are WO 2006/008780, JP 58-034832, JP 58-145431, JP 58-011529, JP 57-131276, U.S. Pat. No. 6,509,392, EP 304005 and WO 04/111101.

Composite panels have been disclosed in U.S. Pat. No. 5,928,772 wherein a rigid foam having a relatively high density is prepared between 2 sheets of fiber reinforced plastic which is made from at least one layer of reinforcing fiber and a heat curable resin, like a radical polymerizable unsaturated resin. When the density of the rigid foam is below 200 kg/m$^3$ the strength of the foam is reduced, therefore, the flexural modulus, flexural strength, etc, of the panel material are reduced and, in addition, buckling occurs in the foam layer under concentrated loads.

Further in U.S. Pat. No. 5,662,996 a composite is disclosed which is a synthetic trim part including an elastomeric polyurethane skin, an open-cell polyurethane foam layer thereon and a polyurethane or polyisocyanurate rigid synthetic carrier on said layer. The carrier may be reinforced.

Still further, U.S. Pat. No. 4,871,612 discloses a substrate containing a fiber-mat-reinforced polyisocyanurate with a surface layer integrally formed on the substrate. The surface layer may include non-foamed plastic as an outer layer and foamed plastic as an inner layer or layers of a fabric, a resilient foam and a thermoplastic resin sheet.

EP 1346819 discloses a composite which is made by hot moulding a substrate which has been provided at one or both sides with a polyurethane resin.

Finally EP 1199154 discloses a multilayer product. According to EP 1199154, known products, which are sandwich products comprising a layer of polyurethane inserted between two layers of fibre glass and/or natural fibre impregnated with polyurethane resin, are subsequently hot moulded to obtain the desired element. Thermo-sensitive polyurethane resin is needed for this. EP 1199154 proposes a multilayered product with a variation in rigidity. This product comprises a first element consisting of a layer of spongy, semi-rigid polymer coupled on one or both sides with a layer of polyurethane resin, and inserted between two layers of glass fibre and/or natural fibre, said first element being coupled with at least a second element. The spongy, semi-rigid polymer preferably is polyurethane with a density of 20 to 40 kg/m$^3$. The composites proposed have a complicated layer structure.

Surprisingly we have found a novel composite panel which has a very light weight together with a very high strength and good fire properties.

Therefore the present invention is concerned with a composite panel which comprises a layer of foamed material having a density of less than 100 kg/m$^3$, preferably 10-50 kg/m$^3$, more preferably 10-35 kg/m$^3$ and most preferably 10-25 kg/m$^3$, which layer is sandwiched between 2 layers of fiber reinforced polyisocyanurate material. The layer of foamed material having a density of less than 100 kg/m$^3$ (hereinafter "the light weight layer") preferably has a thickness which is greater than the thickness of the two layers of fiber reinforced polyisocyanurate material (hereinafter "PIR-layer") together. They may be used as light weight structural panels for partioning walls in housing, especially in cases where sound absorption also is important and as automotive parts.

One or more layers of foamed material may be sandwiched between PIR-layers; the composite may comprise n light weight layers sandwiched between n+1 PIR-layers. Preferably n is 1-3, more preferably 1-2 and most preferably 1.

The foamed material may be any material known, like foamed polystyrene, foamed polyethylene, foamed polypropylene and foamed polyurethane. Polyurethane foams are preferred, like flexible, rigid and semi-rigid polyurethane foams.

The polyurethane foams may be hydrophilic or hydrophobic. They may be acoustic foams, visco-elastic foams, high-resilience foams or insulation foams.

The panels will have certain specific properties depending on the type of foam chosen together with great strength and fire properties despite the very low density of the foam.

Preferred foams are open cell rigid foams, like those disclosed in EP 830419, and open cell flexible foams, in particular those open cell rigid and flexible foams having in the area between 1000 and 2000 Hz and between 0.7 and 1.0 absorption at least an area of 30% under the absorption curve and having a maximal sound absorption of >0.8 (measured according to ASTM E1050-98 in a Kundt tube and at a foam thickness of 20 mm), this maximal absorption being reached at a frequency between 1000 and 2000 Hz. Composite panels according to the invention made from these foams are very suitable for applications wherein sound absorption and/or sound insulation is important.

The fibers used in making the fiber reinforced layers of polyisocyanurate material may be natural fibers like flax, hemp and sisal; synthetic fibers like polyamide, polyolefin, polyaramide, polyester and carbon fibers; and mineral fibers like glass and rock wool fibers. Combinations of fibers may be used.

The thickness of the layers may vary between wide ranges. The PIR layers may vary between 0.1 mm and 10 cm and preferably between 0.2 mm and 2 cm. The light weight layer may vary from 1 mm to 1 m and preferably from 0.5 cm to 10 cm. The width and the length of the layers is determined by the size of the mould wherein the panels are made.

Preferably the foamed material is attached and more preferably directly attached to the 2 layers of fiber reinforced polyisocyanurate material.

The panel according to the invention is made by allowing a composition comprising a polyisocyanate and a polyol to react at elevated temperature in a mould and in the presence of a trimerization catalyst, wherein this composition is in close contact with 2 layers of fiber between which a layer of foamed material is sandwiched.

The fiber reinforced polyisocyanurate material is made by a process which comprises combining a polyisocyanate, a polyether polyol and a trimerization catalyst, these three ingredients collectively being referred to as 'reactive binder composition', with a fiber to form a reactive composite, and allowing in a next step this reactive composite to react at elevated temperature, wherein the amount of the reactive binder composition is 1-80% by weight and the amount of fiber is 20-99% by weight, both calculated on the amount of the reactive binder composition plus the amount of fiber, and wherein the amount of the polyisocyanate and the polyol is such that the index of the reactive binder composition is 140-2000.

In the context of the present invention the following terms have the following meaning:
1) isocyanate index or NCO index or index:
   the ratio of NCO-groups over isocyanate-reactive hydrogen atoms from polyols in a formulation, given as a percentage:

$$\frac{[NCO] \times 100}{[\text{active hydrogen}]}(\%).$$

In other words the NCO-index expresses the percentage of isocyanate actually used in a formulation with respect to the amount of isocyanate theoretically required for reacting with the amount of isocyanate-reactive hydrogen from said polyols used in a formulation.

It should be observed that the isocyanate index as used herein is considered from the point of view of the actual polymerisation process preparing the material involving the isocyanate and the polyol. Any isocyanate groups consumed in a preliminary step to produce modified polyisocyanates (including such isocyanate-derivatives referred to in the art as prepolymers) are not taken into account in the calculation of the isocyanate index. Only the free isocyanate groups and the free isocyanate-reactive hydrogens (of said polyols) present at the actual polymerisation stage are taken into account.

2) The expression "isocyanate-reactive hydrogen atoms" as used herein for the purpose of calculating the isocyanate index refers to the total of active hydrogen atoms in hydroxyl groups present in the polyol; this means that for the purpose of calculating the isocyanate index at the actual polymerisation process one hydroxyl group is considered to comprise one reactive hydrogen.

3) The expression "polyisocyanurate" as used herein refers to products as obtained by reacting the mentioned polyisocyanates and polyols in the presence of trimerization catalysts at a high index, i.e. 140-2000.

4) The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation.

5) The word "average" refers to number average unless indicated otherwise.

6) Trimerisation catalyst: a catalyst enhancing the formation of polyisocyanurate groups from polyisocyanates.

The polyisocyanate may be chosen from aliphatic, cycloaliphatic, araliphatic and, preferably, aromatic polyisocyanates, such as toluene diisocyanate in the form of its 2,4 and 2,6-isomers and mixtures thereof, diphenylmethane diisocyanates and variants thereof, and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate, diphenylmethane diisocyanates, polymethylene polyphenylene polyisocyanates and/or variants of such MDI and crude or polymeric MDI may be used as well.

Variants include isocyanate-terminated products comprising urethane, uretonimine, carbodiimide, urea, biuret and/or allophanate groups made from MDI, crude MDI and/or polymeric MDI.

The polyol used has an average equivalent weight of 53-2500, and an average nominal hydroxyl functionality of 2-8 and more preferably of 2-6.

Such polyols are widely known and include diethylene glycol, triethylene glycol, polyethylene glycol, dipropylene glycol, tripropylene glycol, polypropylene glycol, other polyether polyols, and polyester polyols. Such polyols are commercially available. Examples are Daltolac™ R200, Daltocel™ F428, Daltocel F526, F442, F444 and F555, all ex Huntsman. Mixtures of polyols may be used as well.

Any compound that catalyses the isocyanate trimerisation reaction (isocyanurate-formation) can be used as trimerisation catalyst in the process according to the present invention, such as tertiary amines, triazines and most preferably metal salt trimerisation catalysts.

Examples of suitable metal salt trimerisation catalysts are alkali metal salts of organic carboxylic acids. Preferred alkali metals are potassium and sodium, and preferred carboxylic acids are acetic acid and 2-ethylhexanoic acid.

Most preferred metal salt trimerisation catalysts are potassium acetate (commercially available as Polycat 46 from Air Products and Catalyst LB from Huntsman and potassium 2-ethylhexanoate (commercially available as Dabco K15 from Air Products). Two or more different metal salt trimerisation catalysts can be used in the process of the present invention.

The trimerisation catalyst is generally used in an amount of 0.01-5% by weight based on the weight of the polyisocyanate and the polyol, preferably 0.05-3% by weight. It may occur that the polyisocyanate and/or the polyol used in the process according to the present invention still contains metal salt from its preparation which may then be used as the trimerisation catalyst or as part of the trimerisation catalyst.

The relative amounts of the polyisocyanate and the polyol are such that the index is 140-2000 and preferably 150-1500.

The polyisocyanate, the polyol and the trimerization catalyst may be combined with the fiber in any order. Preferably the polyisocyanate, the polyol and the trimerization catalyst are combined in an initial step so as to form a reactive binder composition, which in a next step is combined with the fiber. The preparation of the reactive binder composition may be done by combining and mixing the polyisocyanate, the polyol and the catalyst in any order, preferably at an initial temperature between 5° C. and 40° C. and more preferably between 10° C. and 30° C. Preferably the polyol and the catalyst are combined and mixed first, followed by combining and mixing with the polyisocyanate. The combining and mixing of the ingredients for the reactive binder composition is generally conducted at ambient pressure and for a time and with equipment which ensures proper mixing. In general mixing with a traditional mixer for 5 seconds up to 5 minutes will be sufficient for achieving this; alternatively impingement mixing may be used. As mentioned before, the catalyst may already be present in the polyisocyanate and/or the polyether polyol in a sufficient amount. In that case only the polyisocyanate and the polyether polyol need to be combined and mixed.

The reactive binder composition can be left at room temperature for a time which is sufficient for its further use without seriously affecting its further processability during this period of time. This reactive binder composition is subsequently combined with the fiber to form a reactive composite. Surprisingly this reactive composite has a low reactivity at ambient conditions; it may be stored at lower temperatures.

The combining of the reactive binder composition and the fiber preferably is conducted at an initial temperature of 5-40° C. and at ambient pressure and may be conducted by coating, impregnating, laminating, pouring, kneading, calendering, extruding, mixing and/or spraying of the binder composition and/or any other suitable way which ensures thorough contact between the reactive binder composition and the fiber.

The amount of the reactive binder composition is 1-80 and preferably 10-70% by weight and the amount of the fiber is 20-99 and preferably 30-90% by weight, both calculated on the amount of reactive binder composition plus the amount of fiber.

Optionally additional ingredients may be used in the process like blowing agents e.g. water and pentane, catalysts enhancing the formation of urethane bonds like tin catalysts like tin octoate and dibutyltindilaurate, tertiary amine catalysts like triethylenediamine and imidazoles like dimethylimidazole and other catalysts like maleate esters, acetate esters and metal carboxylates; surfactants; fire retardants; smoke suppressants; UV-stabilizers; colorants; microbial inhibitors; plasticizers and internal mould release agents. Still further isocyanate-reactive chain extenders and cross-linkers having an average equivalent weight below 53 may be used, like ethylene glycol, propylene glycol, butane diol, hexane diol and glycerol. These chain extenders and cross-linkers preferably are not used or only to the extent as necessary in view of the fact that commercial grades of catalyst may contain such chain extenders and/or cross linkers.

The optional ingredients may be added to any of the ingredients used in the process of the present invention and/or to the reactive binder composition and/or to the reactive composite.

The optional ingredients are preferably added to the polyol or to the reactive binder composition. The optional ingredients are used in small amounts; the total amount generally does not exceed 10% by weight of the reactive composite and preferably less than 8% by weight of the reactive composite (reactive binder composition+fiber).

Subsequently the reactive composite is put on both sides of the foamed material and then this combination is placed in a mould, which preferably has been treated with an external mould release agent. Alternatively the fiber is first put on both sides of the foamed material and subsequently the fiber is brought in contact with the reactive binder composition e.g. by spraying the reactive binder composition onto the fiber or in any other of the previously described ways. The fiber may advantageously be applied in the form of a mat which has the same length and width as the foamed material.

The three layers are subsequently placed in a mould. Alternatively a fiber matt is first placed in a mould, then sprayed with reactive binder composition, then the foamed material is placed onto the sprayed matt followed by the second matt which is subsequently sprayed. Another alternative process is to put a fiber matt onto one side of the foamed material followed by spraying the matt with reactive binder composition, putting the other fiber matt onto the other, opposite side of the foamed material and spraying this second matt with reactive binder composition and putting these three layers in the mould. In all these alternative ways of operation the mould preferably is treated with an external mould release agent.

Subsequently the mould is closed and the reactive binder composition is allowed to react at a mould temperature of 50-200° C. and preferably of 80-150° C. for a period between 10 seconds and 1 hour and preferably between 15 seconds and 30 minutes. The process may be conducted at ambient pressure but preferably is conducted at elevated pressure, preferably a pressure of 0.1-100 MPa above atmospheric pressure, like in a mould or a laminator.

Finally the mould is opened and the composite panel according to the present invention is removed from the mould. The process may be conducted batch-wise, semi-continuously or continuously.

Surprisingly it was found that after the first composite panel according to the present invention has been prepared, several subsequent panels may be made without again treating the mould with external mould release agent. Therefore a special embodiment of the process according to the present invention is a process wherein the following steps are conducted:
 1. an external mould release agent is applied onto at least those surfaces of the mould which will be in contact with the ingredients used for preparing the panel;
 2. the ingredients to be used for preparing the panel are put into the mould;
 3. the ingredients are allowed to react and to form the panel;
 4. the panel so formed is removed from the mould and
 5. steps 2, 3 and 4 are repeated at least 10 times without repeating step 1.

The panels obtained have comparable physical properties irrespective of whether the material is obtained after steps 2, 3 and 4 have been conducted once, 10 times, 25 times, 40 times or even more.

The moulding process may be conducted in an open mould and in a closed mould; preferably the reaction takes place in a closed mould.

As said, step 2-4 are repeated at least 10 times without repeating step 1; preferably this is at least 15 times and most preferably at least 25 times. Although, it would be desirable that steps 2-4 could be repeated as many times as possible without repeating step 1, practice has shown that it may be desirable to repeat step 1, after steps 2-4 have been repeated a considerable number of times without repeating step 1. In general it can be said that step 1 is to be repeated when a substantial increase of the force needed to remove a panel is observed, compared to the force needed to remove the first panel, to such an extent that it is to be expected that the next demoulding can not be made without damaging the panel. Those involved in demoulding on commercial production lines will be able easily to determine if and when step 1 is to be repeated. Although not yet needed because of deteriorating demoulding performance, it might nevertheless be desirable to repeat step 1 after a certain time period, in order to have a consistent production process. In that context it might be desirable to repeat step 1 between two shifts (of e.g. 8 hours), after 24 hours or after a week depending on the complexity of the mould.

The process may be conducted in any type of mould known in the art. Examples of such moulds are the moulds commercially used for making polyurethane furniture parts, automotive seating and automotive parts.

The material of the mould may be selected from those known in the art like metal, e.g. aluminium, and epoxy resin.

Step 1 of the preferred process according to the invention may be conducted in any way known in the art. Applying an external mould release agent on the surfaces of a mould, which surfaces will be in contact with the ingredients used for making the panel includes any way of applying such an agent to the surfaces, like rubbing, brushing, spraying and combinations thereof and applying any agent or agents intended to facilitate the later demoulding. One or more external mould release agents may be used or mixtures of external release agents.

The external mould release agents may be applied as such or as a solution, emulsion or dispersion in a liquid.

The external mould release agents, applied in step 1, may be applied in one or more stages. Any external mould release agent known in the art may be applied; examples of suitable external mould release agents are Kluberpur 41-0039 and 41-0061 (both from Kluber Chemie), Desmotrol D-10RT from Productos Concentrol S.A., Acmosil 180 STBH and Acmosil 35-5119 from Fuller and Johnson Cire 103 from Johnson and Johnson.

The present invention is illustrated with the following examples.

EXAMPLE 1

An open cell, acoustic polyurethane foam having a density of 22 kg/m$^3$ was used as the light weight layer. The size of the layer was 100×50×1 cm. 450 g of glass matt was evenly spread and positioned upon one side of the light weight layer and sprayed with 450 g of a reactive binder composition. Then the layer and the glass matter were turned upside down and another 450 g of glass matt was evenly spread and positioned upon the other (opposite) side of the light weight layer. This glass matt was also sprayed with 450 g of said reactive binder composition. Then these 3 layers were put in a mould having as internal size: 100×50×1.2 cm. The mould was treated with external mould release agent (Acmosil 35-5119). The mould temperature was 140° C. Subsequently the mould was closed. After 10 minutes a light weight, very strong composite panel according to the present invention was demoulded. Without treating the mould with further external mould release agent, 50 composite panels were made following the above procedure. The experiment was voluntarily stopped. All panels could be demoulded without damage.

The reactive binder composition was sprayed with a mix gun combining 225 pbw of Suprasec™ 5115, ex Huntsman and a polyol composition (index 181). The polyol composition was made before, by combining and mixing the following ingredients: 59.04 pbw Daltolac™ R200, ex Huntsman; 25.27 parts by weight (pbw) of Simulsol TOFP ex Seppic SA; 6.7 pbw of Loxiol G71S, ex Cognis; 4.33 pbw Sylfat 2R ex Arizona Chemical; 0.79 pbw of Priolube 1414 ex Uniqema, 0.55 pbw of catalyst LB ex Huntsman, 2.35 pbw of black Repitan IN99430 ex Repi, 0.5 pbw of BYK LPX7102 ex BYK-chemie and 0.47 pbw of water.

EXAMPLE 2

An open cell, acoustic polyurethane foam having a density of 22 kg/m$^3$ was used as the light weight layer. The size of the layer was 100×50×1 cm. 450 g of glass matt was evenly spread and positioned upon one side of the light weight layer and sprayed with 450 g of a reactive binder composition. Then the layer and the glass matter were turned upside down and another 900 g of glass matt was evenly spread and positioned upon the other (opposite) side of the light weight layer. This glass matt was sprayed with 900 g of said reactive binder composition. Then these 3 layers were put in a mould having as internal size: 100×50×1.2 cm. The mould was treated with external mould release agent (Acmosil 35-5119). The mould temperature was 100-120° C. Subsequently the mould was closed. After 10 minutes a light weight, very strong composite panel according to the present invention was demoulded.

The reactive binder composition was sprayed with a mix gun combining 225 pbw of Suprasec™ 5115, ex Huntsman and a polyol composition (index 181). The polyol composition was made before, by combining and mixing the following ingredients: 59.04 pbw Daltolac™ R200, ex Huntsman; 25.27 parts by weight (pbw) of Simulsol TOFP ex Seppic SA; 6.7 pbw of Loxiol G71S, ex Cognis; 4.33 pbw Sylfat 2R ex Arizona Chemical; 0.79 pbw of Priolube 1414 ex Uniqema, 0.55 pbw of catalyst LB ex Huntsman, 2.35 pbw of black Repitan IN99430 ex Repi, 0.5 pbw of BYK LPX7102 ex BYK-chemie and 0.47 pbw of water.

EXAMPLE 3 (COMPARATIVE)

Example 2 was repeated with the proviso that trimerization catalyst, catalyst LB, was not used, that the index was 100 and that 0.5 pbw of urethane catalyst Dabco EG was employed.

The panels obtained according to examples 2 and 3 had the following properties:

|  | Overall density, kg/m$^3$ | Flexural Modulus, MPa | Tensile Strength, MPa | Impact Pendulum, kJ/m$^2$ | Burn through, min |
|---|---|---|---|---|---|
| Example 2 | 210 | 421 | 280 | 4.92 | 6.5 |
| Example 3 | 210 | 381 | 122 | 3.86 | 0.75 |

The following tests were used:
density: DIN 53420;
flexural modulus: ISO 14125;
tensile strength: ISO 527 pt 1 and 2;
impact pendulum: ISO 180; and
burn through: this is a test wherein the time is measured which it takes for a flame to burn from one side to the other through a test piece as made above but cut to pieces of 15×15 cm, wherein a propane torch is used with a flame temperature of about 1200° C., wherein the torch is kept at a distance of about 5 cm from the middle of the thin glass mat layer side with the flame on the thin glass mat layer side.

The invention claimed is:
1. A process for making a composite panel, wherein the composite panel comprises a foam material sandwiched between two fiber containing polyisocyanurate layers, the method comprising:
applying a reactive composite comprising (i) a polyisocyanate, (ii) a polyether polyol, (iii) a trimerization catalyst, and (iv) a fiber onto at least a portion of two sides of the foam material thereby forming a coated foam material;
placing the coated foam material into a mould; and
forming the polyisocyanurate layers by reacting components (i), (ii), and (iii) at a temperature ranging from 50° C. to 200° C. while the coated foam material is in the mould thereby forming the composite panel,
wherein (a) the foam material is selected from the group consisting of polystyrene, foam polyethylene, foamed polypropylene, and foamed polyurethane, (b) the foam material has a density of less than 100 kg/m³, and (c) the reactive composite has been pre-formed and stored at a temperature less than or equal to ambient temperature for a period of time before being applied onto the foam material.

2. The process according to claim 1, wherein the mould comprises a release agent disposed on at least those surfaces of the mould which will be in contact with the foam material or the reactive composition.

3. The process according to claim 1, wherein the temperature ranges from 80° C. to 150° C.

4. The process according to claim 1, wherein the foam material in the composite has a density ranging from 10 kg/m³ to 50 kg/m³.

5. The process according to claim 1, wherein the foam material in the composite has a density ranging from 10 kg/m³ to 35 kg/m³.

6. The process according to claim 1, wherein the foam material in the composite has a density ranging from 10 kg/m³ to 25 kg/m³.

7. The process according to claim 1, wherein the thickness of the foam material is greater than the thickness of the polyisocyanurate layers together.

8. The process according to claim 7, wherein the foam material is a polyurethane foam material.

9. The process according to claim 1, wherein components (i), (ii), and (iii) are reacted at a pressure ranging from 0.1 mPA to 100 mPA above atmospheric pressure.

10. The process according to claim 1, further comprising removing the composite panel from the mould.

\* \* \* \* \*